O. DORSEY.
Harvester Dropper.
No. 56,534.
3 Sheets—Sheet 1.
Patented July 24, 1866.
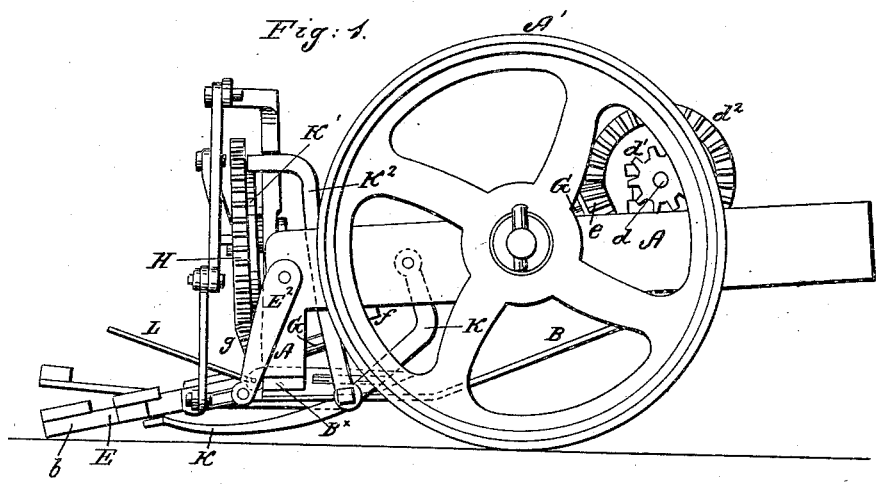
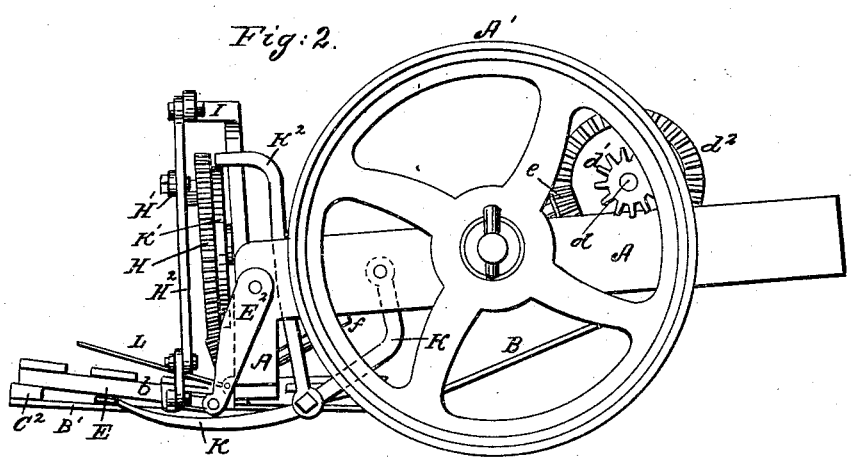
Witnesses:
R. T. Campbell
Edw. Schafer
Inventor:
Owen Dorsey
by attys:
Mason Fenwick & Lawrence

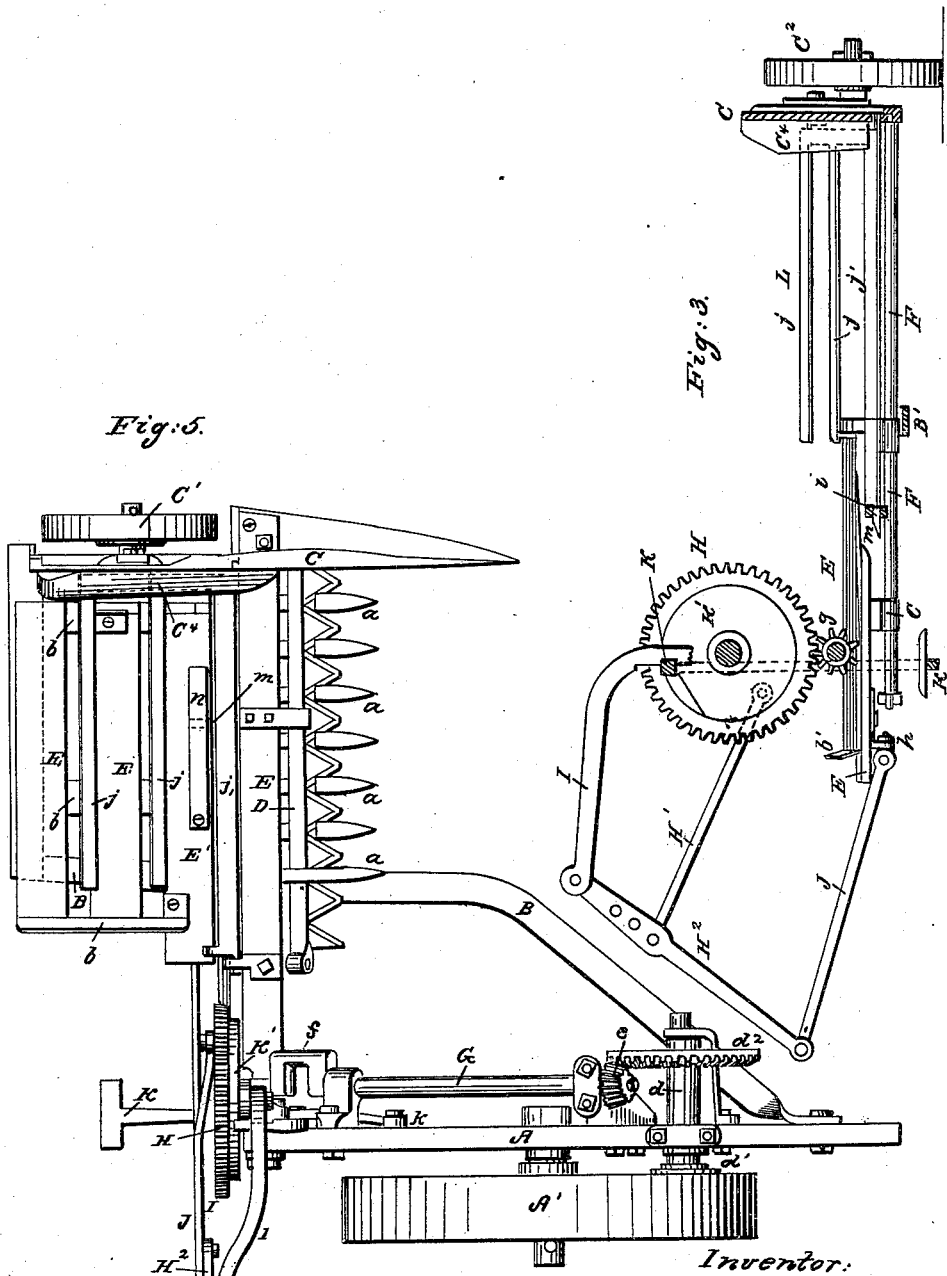

O. DORSEY.
Harvester Dropper.
No. 56,534.
3 Sheets—Sheet 3.
Patented July 24, 1866.
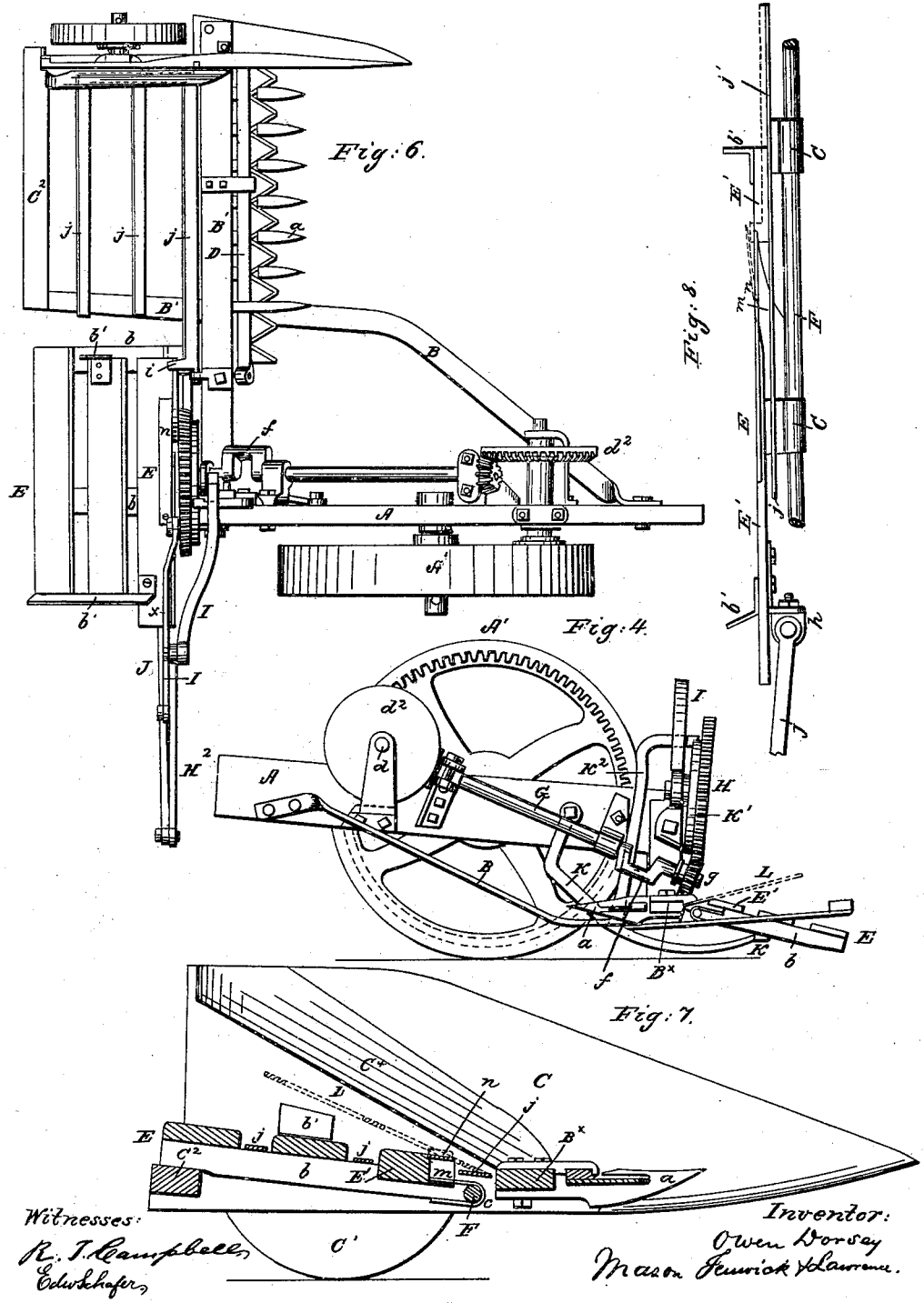

UNITED STATES PATENT OFFICE.

OWEN DORSEY, OF NEWARK, OHIO.

IMPROVEMENT IN REAPING-MACHINES.

Specification forming part of Letters Patent No. 56,534, dated July 24, 1866.

*To all whom it may concern:*

Be it known that I, OWEN DORSEY, of Newark, in the county of Licking and State of Ohio, have invented a new and Improved Side-Delivery Harvester; and I do hereby declare that the following is a full, clear, and exact description thereof, reference being had to the accompanying drawings, making a part of this specification, in which—

Figure 1, Sheet 1, is an elevator of the outer side of the harvester, showing the movable grain-platform in a position for delivering the gavel upon the ground. Fig. 2, Sheet 1, is a similar view, showing the platform in a position for receiving the falling grain. Fig. 3, Sheet 2, is a front view of the delivering apparatus. Fig. 4, Sheet 2, is an elevation of the machine, looking from the grain or inner side thereof, and showing the movable platform in a position for discharging the gavel. Fig. 5, Sheet 2, is a plan view of the machine, with its platform in rear of the finger-beam. Fig. 6, Sheet 2, is a plan view of the machine, showing the platform in position for delivering its gavel in rear of the draft-frame. Fig. 7 is an enlarged vertical sectional view through the platform and grain-fender. Fig. 8 is a front edge view of the movable platform and its pivoted rod.

Similar letters of reference indicate corresponding parts in the several figures.

This invention relates to a new and improved mode of constructing side-delivery harvesting-machines, whereby the grain is delivered in gavels upon the ground in rear of the draft-frame without employing a rake for such purpose.

The nature of my invention consists in the employment of a reciprocating slotted platform, which shall be moved automatically back and forth from a position which is in rear of the cutting apparatus to a position which is in rear of the draft-frame, and when in this latter position the platform shall be tilted so as to deliver its load out of the way of the team in the succeeding passages around the field, as will be hereinafter described.

It also consists in sustaining the falling grain upon a fender-guard during the delivery of the gavel from a reciprocating platform, and so arranging and operating said fender that when the platform is in a position behind the cutting apparatus the fender will descend out of the way and allow the grain to fall directly upon the platform and to be moved thereon to a position which is in rear of the draft-frame, as will be hereinafter described.

To enable others skilled in the art to understand my invention, I will describe its construction and operation.

In the accompanying drawings I have represented a single-wheel harvesting-machine; but my invention may be applied to a two-wheel frame in any suitable manner.

The beam A has a short axle projecting from its outer side, upon which the large wheel A' is applied, that serves both as a transporting-wheel and a driving-wheel. Near the forward end of the beam A the forward end brace-bar, B, is rigidly secured, which bar curves outward and backward, and is secured at its rear end to the finger-beam B'. This finger-beam has its inner end turned up so as to form a right angle, which is secured rigidly to the rear end of the beam A. The inner end of the finger-beam has a divider, C, secured to it, which extends back and is supported upon a wheel, C', that supports the inner end of the machine. Two bars, C² and B', serve as a rear frame for sustaining the platform when it is in a position to receive the grain upon it.

The sickle-bar D and fingers $a$ $a$ may be constructed in any of the well-known ways for cutting grain.

The platform E consists of a number of slats, which are secured to battens $b$ $b$ so as to leave narrow parallel spaces between them, which spaces are in lines parallel to the finger-beam B'. At the extremities of this slatted platform elevated guards $b'$ $b'$ are secured, for the purpose of preventing the cut grain from falling off at said points.

The front ends of the two battens $b$ $b$ have metal eyes $c$ $c$ secured to them, by which means the platform is hinged to a long rod, F, that lies just in rear of the finger-beam and parallel to it, and has its inner end bearing in the divider C and its outer end bearing in a hanger, F', that is secured to the rear end of the beam A. This rod not only serves as a forward pivot for the platform, but allows this platform to reciprocate in a straight line and to be moved from the position in which it is shown in Fig. 5 to the position shown in Fig. 6. This rectilinear reciprocating movement of the platform is effected in the following manner: A short transverse shaft, $d$, has its bearings upon the forward portion of the beam A, and carries on its ends two spur-wheels, $d'$ $d^2$. The spur-wheel $d'$ engages with and is driven by the inside gearing on the large wheel A'. The bevel-wheel $d^2$ engages with and rotates a pinion-wheel, $e$, which is keyed on the upper end and forward end of an inclined shaft, G, which inclines backward and has its bearing in brackets projecting from the beam A, as shown in Figs. 4, 5, and 6. This shaft G has a crank, $f$, formed on it in a position to receive a pitman-rod that actuates the sickle, and on the rear extremity of this rod a pinion-wheel, $g$, is applied, which engages with the teeth of a large spur-wheel, H, that is pivoted to a short shaft projecting from the rear end of the beam A, and when the shaft G is rotated the wheel $g$ will rotate the large wheel H. This wheel H has a pitman-rod, H', pivoted to its rear face, which is pivoted at its outer end to an arm, H², so that when the wheel H is turned the lower end of this arm H² will receive a vibrating movement. The upper end of arm H² is pivoted to an overhanging arm, I, which is secured rigidly to the beam A just in front of the wheel H. The lower end of the arm H² is pivoted to one end of a pitman-rod, J, the opposite end of which is pivoted, by a swivel-joint, $h$, to the lower side of the front slat of the platform, as shown in Figs. 3 and 8.

When the platform has been drawn outward to the required position for delivering the gavels upon the ground, as shown in Fig. 6, it is tilted or inclined backward, as shown in Figs. 1 and 4, by its own gravity, and after the delivery of its gavel this platform is again raised to its former position (shown in Figs. 2 and 7,) by means of a curved lifting-bar, K, which is pivoted at its forward end to the beam A, and actuated by a cam-wheel, K', on the short shaft of the spur-wheel H through the medium of a connecting-rod, K².

During the delivery of the gavel upon the ground from the platform E a fender, L, receives upon it the falling grain, and when the platform is returned to a position beneath this fender and in rear of the sickle the fender drops down and deposits the grain upon the platform, to be moved to one side and delivered upon the ground. This fender consists of three or more narrow arms, $j$ $j'$, which are parallel to each other, and arranged at such distance apart as will allow them to fall between the slats of which the platform is composed, as shown in Fig. 7, Sheet 2. The three arms composing the fender are connected to a longitudinal arm which is located between an inclined flange, C⁴, which is formed on the inside of the divider C. The opposite ends, or those ends of the fender-arms which are nearest the driving-wheel A', are not connected together. The ends of the forward fender-arm, $j'$, are pivoted so that this arm lies just in rear of the finger-beam B' and over the rod F, to which the platform is hinged. This fender-arm $j'$ is somewhat longer than the other arms of the fender, and on that end which is nearest the driving-wheel a projection, $i$, is formed on it, which projection is acted upon by the front slat E' of the platform E, so as to elevate the rear end of the fender at the same time that the platform is tilted backward to discharge its load, and to keep this fender in said position until the platform returns to a position behind the cutting apparatus to receive the grain.

To effect the above-described movement of the fender by the operation of the platform, the slat E' of this platform is constructed with an inclined groove, $m$, in its forward edge and near that end which is farthest from the driving-wheel A', as shown in Figs. 3 and 8. From the groove $m$ to that end of the slat E' which is nearest the drive-wheel the forward edge of this slat is made thin, so as to allow this edge to pass over the tooth $i$ during the movement of the platform toward the point for its delivery. The upper part of this inclined groove $m$ is covered by a thin spring, $n$, which is let into the upper surface of the slat, so as to be flush with it. This spring allows the tooth $i$ to pass up through the inclined groove $m$ and upon the forward edge of the slat E' just before the platform is tilted to discharge, which operation elevates the rear end of the fender, as shown in Figs. 1, 2, and 6. When the load has been discharged and the rear end of the platform is elevated in a position to pass under the fender again, this platform is then moved beneath the fender, during which operation the tooth $i$ will pass over the spring $n$ and along the upper edge of the slat E', thus keeping the fender elevated until the platform arrives at the termination of its stroke, when the tooth $i$ will drop from the end of the slat E' and allow the arms of the fender to drop down between the slats of the platform and below the surface thereof. When the platform receives another load from the fender this platform will commence its delivery-stroke, and will be thus moved until the tooth $i$ ascends the slot $m$ and elevates the fender again, when the platform will be tilted and its load discharged.

The relative speed of the cutting and delivering apparatus may be such that the time occupied in delivering the grain will be equal to that required for cutting a sufficient quantity to form a bundle. This being the case the strokes of the platform can be made regular and uniform.

It will be seen from the above description of my invention that the grain first falls upon a vibrating slatted fender during the delivery of a gavel. The fender then drops down and delivers its gathered load upon the platform, and remains beneath the surface thereof until the platform moves away and is tilted backward in a position to deliver its load upon the ground. The grain does not fall directly upon the platform, but upon the fender, which latter delivers the proper quantity to form a gavel upon the platform.

Having thus described my invention, what I claim as new, and desire to secure by Letters Patent, is—

1. Combining a rectilinear reciprocating platform with a vibrating fender in such manner that the grain, after it falls upon the fender, shall be deposited upon the platform, conveyed, and by the latter delivered upon the ground at one side of the machine, substantially as described.

2. The combination of a rectilinear reciprocating platform which is composed of slatted bars with a vibrating slatted fender, substantially as described.

3. Automatically delivering the cut grain from one side of the machine by means of a platform which has a rectilinear and vibrating movement, substantially as described.

OWEN DORSEY.

Witnesses:
HENRY O. DORSEY,
S. BOWEN.